United States Patent Office 3,209,418
Patented Oct. 5, 1965

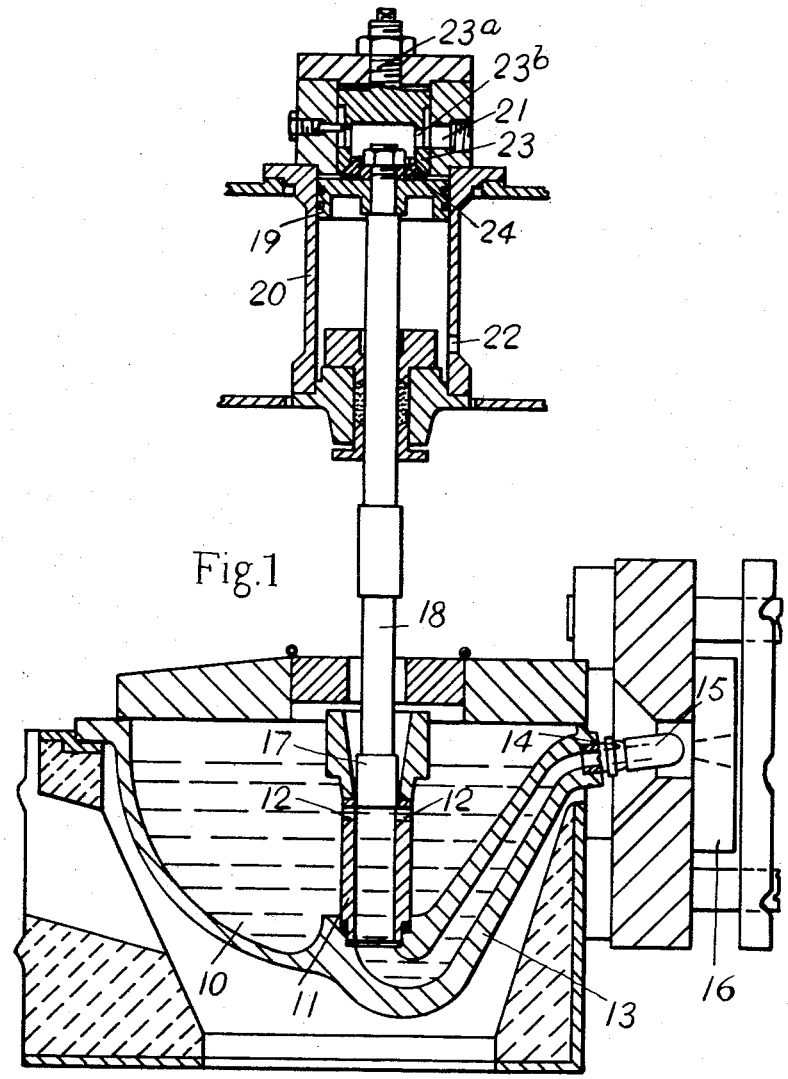

3,209,418
DIE-CASTING MACHINES
Stanley Smith, West Bromwich, England, assignor to E.M.B. Company Limited, West Bromwich, England
Filed Feb. 11, 1963, Ser. No. 257,584
Claims priority, application Great Britain, Feb. 20, 1962, 6,479/62
2 Claims. (Cl. 22—70)

The present invention relates to a die-casting machine of the kind commonly known as a hot chamber machine, namely a machine which includes a reservoir for molten material, an injection cylinder which is disposed within the reservoir and which is connected to a conduit (which may be of the type commonly referred to as a gooseneck), said conduit being adapted at one end to be connected to a die so as in use to convey molten material to the cavity in the die, said injection cylinder having one or more inlet apertures, through which molten metal enters the injection cylinder and the conduit, there being also provided a plunger which is reciprocable in the injection cylinder for injecting molten material into the die cavity.

The reciprocating plunger referred to above is arranged so that at one end of its stroke the aperture or apertures in the injection cylinder is or are uncovered to permit molten material to enter the injection cylinder, said plunger then being in a withdrawn position. Machines of this kind have in the past frequently suffered from the disadvantage that, when the plunger is returned to the withdrawn position, molten material surges into the injection cylinder and overspills onto the face of one of the die parts, thereby preventing subsequent closing of the die.

It is the object of the present invention to provide a die-casting machine of the kind specified in which the above disadvantage is avoided.

In accordance with the invention there is provided a die casting machine of the kind specified wherein adjustable means are provided for varying the inlet area offered by said aperture or apertures whereby the speed of entry of the molten material can be adjusted so as to prevent material from spilling from the machine before the injection stroke of the plunger is initiated.

Preferably such variation in the inlet area of the aperture or apertures is effected by adjustment of the withdrawn position of the plunger, so that the aperture or apertures are partially covered by the plunger when the latter is fully withdrawn.

Conveniently in this case said plunger is connected to a piston which is reciprocable in a further cylinder, reciprocation of the piston being effected by the introduction to the cylinder of fluid under pressure on alternate sides of the piston. Adjustment of the withdrawn position of the plunger may be achieved by adjustment of the position of the piston (hereinafter called the retracted position of the piston) corresponding to said withdrawn position of the plunger.

Preferably the retracted position of the piston is adjusted by means of a movable seating disposed within the cylinder adjacent to one end thereof, the position of said seating being adjustable by screw-threaded means, the arrangement being such that part of the piston engages said seating when said piston occupies its retracted position.

The invention will now be more particularly described with reference to the accompanying drawings, wherein:

FIGURE 1 is a sectional view of the relevant parts of one example of a die-casting machine constructed in accordance with the invention.

Referring to the drawings the die-casting machine includes a reservoir 10 for molten material in which there is disposed a substantially vertical injection cylinder 11. Said injection cylinder is provided adjacent to its upper end with apertures 12 which will in use be disposed below the surface of the molten material, through which apertures 12 the molten material can enter the injection cylinder 11. Said injection cylinder 11 is connected at its other end to a gooseneck 13 which extends above the surface of the liquid. Said gooseneck 13 is adapted to be connected, through the intermediary of a nozzle 14 and a kidney piece 15 to a part 16 of a die.

Disposed within said injection cylinder 11 is a plunger 17 which is connected by means of a piston rod 18 to a piston 19 disposed within a pneumatic cylinder 20 which is coaxial with the injection cylinder 11. Said pneumatic cylinder 20 is provided at each of its ends with inlets 21, 22 for compressed air for reciprocating the piston 19 in the pneumatic cylinder 20 and with it the plunger 17 in the injection cylinder 11. At the upper end of said pneumatic cylinder 20 there is provided a valve seating 23 which is axially movable relative to the pneumatic cylinder. The lower part of said seating 23 is adapted to engage with a valve part 24 connected to the upper part of the piston 19 when the latter is in its retracted position. Said seating 23 has a threaded projection 23$^a$ formed at its upper end, said threaded projection being adapted to engage with a co-acting tapped aperture in a plate which is secured to the upper end of the pneumatic cylinder. Said seating is also provided with ports 23$^b$ through which compressed air can enter the upper part of the pneumatic cylinder.

In use the die parts 16 are clamped together and compressed air is introduced into the upper part of the pneumatic cylinder 20 so that the plunger 17 is advanced from its withdrawn position. Molten material is thus forced under presure into the cavity between the die parts 16, where it freezes. Compressed air is introduced into the lower part of the pneumatic cylinder 20 to return the plunger 11 to its withdrawn position, and the die parts 16 are then separated to permit removal of the casting. When the plunger 17 is in a position in which the apertures 12 in the injection cylinder 11 are uncovered or partially uncovered molten material enters the injection cylinder 11 and refills the gooseneck 13. If, during this re-charging operation, the molten material spills from the kidney piece 15 onto the die 16, it will be evident that the material is entering the injection cylinder 11 too rapidly. To remedy this defect the above-mentioned valve seating 23 in the pneumatic cylinder 20 may be lowered so that in its withdrawn position the plunger 17 covers more of the apertures 12 in the injection cylinder 11, thereby reducing the rate of entry of molten material. Conversely if the molten material enters the injection cylinder 11 too slowly the seating 23 may be raised.

The plunger may alternatively be actuated by hydraulic pressure in a hydraulic cylinder instead of compressed air in a pneumatic cylinder as above described.

Having thus described my invention what I claim as new and desire to secure by Letters Patent is:

1. A die casting machine comprising a reservoir for molten metal, an injection cylinder within said reservoir and having at least one inlet aperture, means for supporting a die, a conduit for carrying molten metal from the injection cylinder to the die, a plunger mounted in the injection cylinder, fluid pressure actuated means for reciprocating the plunger to and from a withdrawn position, said fluid pressure actuating means comprising a further cylinder and a piston mounted within said cylinder so as to be reciprocable therein under the influence of fluid pressure, means connecting the piston to the plunger, a movable annular seating slidably and sealingly contained within one end of the further cylinder, a valve member mounted on the piston and engageable with said seating when the piston occupies a position corresponding to the withdrawn position of the plunger so as to prevent the escape of fluid from the further cylinder when the piston is in its retracted position and screw threaded means for adjusting the position of the seating to vary the retracted position of the piston, so as thereby to adjust the withdrawn position of the plunger, whereby said aperture can be partially covered by the plunger when the latter is in its withdrawn position to vary the inlet area offered by said aperture.

2. A die-casting machine as claimed in claim 1 in which said screw-threaded means comprises a screw formed on the seating and a plate secured to said one end of the further cylinder, said plate having a threaded hole with which said screw coacts to permit adjustment of the seating by rotation thereof.

References Cited by the Examiner
UNITED STATES PATENTS

| | | | |
|---|---|---|---|
| 720,714 | 2/03 | Lightbrown | 22—70 |
| 1,595,783 | 8/26 | Howes | 22—70 |
| 2,340,342 | 2/44 | Plastaras | 22—71 |

J. SPENCER OVERHOLSER, *Primary Examiner.*

MARCUS U. LYONS, *Examiner.*